(12) United States Patent
Koch et al.

(10) Patent No.: US 10,987,789 B2
(45) Date of Patent: Apr. 27, 2021

(54) PRODUCTION AID

(71) Applicant: Ford Global Technologies, LLC, Dearborn, MI (US)

(72) Inventors: Raphael Koch, Odenthal (DE); Lars Bognar, Dormagen (DE)

(73) Assignee: Ford Global Technologies, LLC, Dearborn, MI (US)

(*) Notice: Subject to any disclaimer, the term of this patent is extended or adjusted under 35 U.S.C. 154(b) by 258 days.

(21) Appl. No.: 16/228,917

(22) Filed: Dec. 21, 2018

(65) Prior Publication Data

US 2019/0202041 A1 Jul. 4, 2019

(30) Foreign Application Priority Data

Jan. 2, 2018 (DE) .................. 102018200018.2

(51) Int. Cl.
  *B25B 27/00* (2006.01)
  *B25B 27/14* (2006.01)
  *B33Y 80/00* (2015.01)

(52) U.S. Cl.
  CPC .......... *B25B 27/14* (2013.01); *B25B 27/0035* (2013.01); *B33Y 80/00* (2014.12)

(58) Field of Classification Search
  CPC .... B25B 1/00; B25B 1/20; B25B 5/00; B25B 11/00; B25B 11/02; B23Q 3/00; B23Q 3/06; B23Q 3/154
  See application file for complete search history.

(56) References Cited

U.S. PATENT DOCUMENTS

| 3,608,886 | A | 9/1971 | Greene | |
| 7,086,643 | B2 * | 8/2006 | Teague | B25B 5/006 269/305 |
| 7,802,344 | B2 | 9/2010 | Watts | |

(Continued)

FOREIGN PATENT DOCUMENTS

| DE | 8313564 | 1/1985 |
| DE | 9107104 | 7/1991 |
| DE | 10340052 | 5/2005 |

(Continued)

OTHER PUBLICATIONS

Schmid, et al., Rapid Manufacturing with FDM in Jig & Fixture Construction, Fortus 3D Production Systems, Stratasys Incorporated, 2009.

*Primary Examiner* — Lee D Wilson
(74) *Attorney, Agent, or Firm* — Burris Law, PLLC

(57) ABSTRACT

A production aid for positioning at least one component relative to a further component includes a monolithic positioning main body configured such that, given its prescriptively correct arrangement on the further component, it predefines a prescriptively correct positioning of the component relative to the further component. The positioning main body includes at least one opening, into which a spacer bushing is positively fitted. The spacer bushing has a through hole through which a positioning pin is guided, or a positioning pivot, which is configured monolithically with the spacer bushing. The positioning main body, via the positioning pin or the positioning pivot, makes contact with the further component, and a longitudinal center axis of the through hole is arranged parallelly offset from a longitudinal center axis of the positioning pin or pivot.

20 Claims, 6 Drawing Sheets

(56) References Cited

U.S. PATENT DOCUMENTS 8,960,658 B2 * 2/2015 Vasis .................. B25F 3/00
                                                                                            269/293
2019/0202041 A1 * 7/2019 Koch .................. B25B 27/14

FOREIGN PATENT DOCUMENTS

DE        102015114401       3/2017
WO          2016192919     12/2016

* cited by examiner

PRODUCTION AID

CROSS-REFERENCE TO RELATED APPLICATIONS

This application claims priority to and the benefit of German Application No. 102018200018.2, filed on Jan. 2, 2018. The disclosure of the above application is incorporated herein by reference.

FIELD

The present disclosure relates to a production aid for positioning at least one component relative to a further component.

BACKGROUND

The statements in this section merely provide background information related to the present disclosure and may not constitute prior art.

The additive production of components constitutes a breakthrough manufacturing technology, which in the last decade has increasingly gained in importance. Plastics components can here be manufactured using various techniques, such as, for instance, by selective laser sintering (SLS). Since these components, in contrast to corresponding traditional components which are configured as a subassembly comprising a plurality of interconnected components, can be manufactured as monolithic or one-piece components, a considerable reduction in costs and a reduction in assembly time are associated with the additively produced components.

An example of an additively produced component of this kind is a production aid, with which a component in a production, for instance of vehicles, is positionable relative to a further component. Given its prescriptively correct arrangement on the further component, the production aid predefines a prescriptively correct positioning of the component relative to the further component, so that an attachment of corresponding components in a series production to further components can be ensured with constant quality.

U.S. Pat. No. 7,802,344 B2 relates to a plastics shim having a hole for the fastening of the shim to a variety of objects. The shim can also be breakable for smaller applications, while it is also usable for larger applications without breaking. In a preferred embodiment, each of the break-off sections has a hole for a screw or a nail, so that each of the break-off sections is separately affixable.

WO 2016/192919 A1 relates to a fastening pin for fittings of windows, doors or the like, comprising a bottom part for arranging the fastening pin on a displaceable operating rod of a respective fitting, and a top part for locking engagement in a closing part assigned to the fitting, in dependence on a respective position of the operating rod. The top part has an inner pin, which extends away from the bottom part along a top part axis, and a sleeve, which is mounted such that it can move axially in the direction of the top part axis, in order to enable an adaptation of the axial length of the top part for precisely fitting engagement in the closing part. On the top part, retaining means for holding the sleeve in a defined axial position are provided.

DE 8313564 U1 relates to a clamping plate for the clamping of workpieces. The clamping plate has, in a predefined grid pattern, holes which lie perpendicular to the surface and into which eccentric-clamping disks with fixed pin are insertable and rotatable.

DE 9107104 U1 relates to a modular clamping apparatus for workpieces to be machined, comprising a workpiece holder, comprising an apparatus for the manual and/or mechanical, releasable, non-positive fastening of a workpiece and comprising means for fixing and fastening the clamping apparatus on comparable clamping apparatuses and/or on mounting plates of metal-cutting machines, in particular of a machining center. The clamping apparatus is provided with a slide, in which, in particular perpendicular to the direction of displacement of the slide, a cross slide is displaceably mounted. An eccentric pin, which is mounted rotatably in positive-locking engagement in the cross slide, indirectly actuates the slide.

DE 10340052 A1 relates to a process for the manufacture of, in the finished state, one-piece or multipart three-dimensional clamping elements, in particular flexible complex functional clamping systems, by additive construction, in particular by laser sintering or laser welding.

The publication "RAPID MANUFACTURING WITH FDM IN JIG & FIXTURE CONSTRUCTION" discloses the at least partial manufacture of a production aid, using an additive production process.

However, additively produced production aids lack the dimensional flexibility that multi-piece production aids have which can make it more difficult to correct misalignments.

The present disclosure addresses these issues associated with traditional production aids.

SUMMARY

This section provides a general summary of the disclosure and is not a comprehensive disclosure of its full scope or all of its features.

The present disclosure provides a production aid that can be individually adapted, in a simple manner, to the respective structural conditions.

According to the present disclosure, a production aid is provided for positioning at least one component relative to a further component. The production aid includes a monolithic positioning main body, which is configured such that, given its prescriptively correct arrangement on the further component, it predefines a prescriptively correct positioning of the component relative to the further component, in which on the positioning main body is configured at least one opening, into which there is positively fitted a spacer bushing, which has a through hole, through which a positioning pin is guided, or a positioning pivot, which is configured monolithically with the spacer bushing, wherein the positioning main body, via the positioning pin or the positioning pivot, makes contact with the further component, wherein a longitudinal center axis of the through hole is arranged parallelly offset from a longitudinal center axis of the spacer bushing.

It should be pointed out that those features and measures which are individually cited in the following description can be mutually combined in any chosen technically sensible manner and demonstrate further forms of the present disclosure. The description additionally characterizes and specifies the present disclosure in particular in association with the figures.

According to the present disclosure, the positioning pin or positioning pivot inserted into the through hole of the spacer bushing can be arranged in various positions relative to a section, comprising the opening, of the monolithic positioning main body, in that the spacer bushing is arranged, with respect to its longitudinal center axis, in various rotational positions relative to this section. As a result, the production aid can be adapted in a simple manner to the respective geometric or structural conditions, in particular of the further component, so that that component which is to be attached to the further component, for instance also in the event of dimensional discrepancies between the components, can be positioned in a prescriptively correct manner relative to the further component and attached thereto. Pre-measured dimensional discrepancies can here be compensated or eliminated.

On the positioning main body can also be configured two or more corresponding openings, into which there is respectively positively fitted a dedicated spacer bushing, which has a through hole, through which a dedicated positioning pin is guided, or a positioning pivot, which is configured monolithically with the spacer bushing, wherein the positioning main body, via the positioning pin or the positioning pivot, makes contact with the further component, wherein the longitudinal center axis of the through hole is arranged parallelly offset from a longitudinal center axis of the spacer bushing. Then, for instance hand-operable, production aid can make contact with the further component solely via the positioning pin or pins or the positioning pivot or pivots and, moreover, can be arranged at a distance from the further component.

That component which is to be attached to the further component can be connected, after its prescriptively correct positioning relative to the further component, for instance positively or non-positively to the further component. The further component can be a body section of a motor vehicle, to which the component is to be attached. To this end, the production aid is firstly arranged on the further component such that the production aid, due to its structural design and given its prescriptively correct arrangement on the further component, predefines the respective prescriptively correct positioning of the component relative to the further component. Subsequently, the component has only yet to be connected to the further component.

In reference to the positioning main body, the term "monolithic" should be construed to mean that the positioning main body is not formed of two or more separately manufactured components, but has been formed in one piece in a manufacturing process. The positioning main body can be configured as a hollow body or solidly configured. The positioning main body can have a complex geometry which is adapted to the respective purpose of use or to the shaping of the respective further component and the shaping of the component to be connected thereto.

According to an advantageous form, the positioning main body is produced additively. As a result, the positioning main body can also be manufactured with a very complex geometry in a simple and cost-effective manner. In contrast to traditional production aids, which are formed of a plurality of mutually connected components, no subsequent machining steps, such as, for instance, milling or the like, are involved. The positioning main body can be manufactured, for instance, by a 3D-printing process or a SLS process. In particular, the positioning main body can be made of a plastic.

A further advantageous form provides that an outer peripheral surface of the spacer bushing and a therewith contacting inner peripheral surface of a section, comprising the opening, of the positioning main body are respectively configured as a hollow cylinder having a circular or polygonal base area. Both forms enable various relative positions of the spacer bushing to that section of the positioning main body which has the opening. If the outer peripheral surface of the spacer bushing and the inner peripheral surface of the section comprising the opening are respectively configured as a hollow cylinder having a circular base area, the spacer bushing can be arranged in any chosen number of different relative positions to the section. If the outer peripheral surface of the spacer bushing and the inner peripheral surface of the section comprising the opening are respectively configured as a hollow cylinder having a polygonal base area, the spacer bushing can be arranged in a limited number of different discrete relative positions to the section. The polygonal base area can be configured, for instance, as an equilateral triangle, square or other regular polygon, thus as an equilateral and equiangular polygon.

According to a further advantageous form, on an axial end face of the spacer bushing is arranged at least one marking, which indicates a direction in which the longitudinal center axis of the through hole is arranged parallelly offset from the longitudinal center axis of the spacer bushing. As a result, a user of the production aid can visually detect whether the spacer bushing is arranged in such a way relative to that section of the positioning main body which comprises the opening that an intentional adaptation of the production aid at least to the further component is given, for instance in order to compensate for dimensional discrepancies. The marking can be arranged, for instance, on that side of the through hole which has the shortest radial distance to the outer peripheral surface of the spacer bushing. The marking can be configured as a colored and/or physical marking.

Advantageously, on the positioning main body, adjacent to the section comprising the opening, at least one marking is arranged. This is in particular of advantage if the outer peripheral surface of the spacer bushing and the inner peripheral surface of the section comprising the opening are respectively configured as a hollow cylinder having a circular base area and a marking is arranged on the spacer bushing, since then the marking on the spacer bushing can be oriented to adjust the parallel offset between the longitudinal center axes of the through hole and spacer bushing relative to the marking on the positioning main body. The marking on the positioning main body can be configured as a single marking or as a scale on which various orientations of the spacer bushing relative to the section are readable and hence adjustable. Alternatively, the marking on the positioning main body can be configured as a single marking, and the marking on the spacer bushing as a scale.

According to a further advantageous form, the production aid comprises at least two differently configured spacer bushings, which can selectively be fitted into the opening and which differ from one another in terms of the distance of the longitudinal center axis of the respective through hole from the longitudinal center axis of the respective spacer bushing. The various spacer bushings can be standardized, for instance 0.1 mm offset bushing, 0.2 mm offset bushing etc., and be reusable. Through the choice of the respective spacer bushing and its insertion into the opening on the positioning main body, the production aid can be adapted in a simple manner to the respective application. In one example, an external shape of the spacer bushings is identical.

A further advantageous form provides that the spacer bushing is manufactured using an additive production process or an injection molding process. The spacer bushing, in particular of plastic, is hereby able to be manufactured in a simple and cost-effective manner. The spacer bushing can be produced additively together with the positioning pivot.

According to a further advantageous form, on the positioning main body are configured at least two corresponding openings, the longitudinal center axes of which are oriented non-parallel to one another and into which there is respectively positively fitted a dedicated spacer bushing, which has a through hole through which a dedicated positioning pin via which the positioning main body makes contact with the further component is guided, wherein a longitudinal center axis of the through hole is arranged parallelly offset from a longitudinal center axis of the spacer bushing. As a result, the production aid can be adapted three-dimensionally to the respective application.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
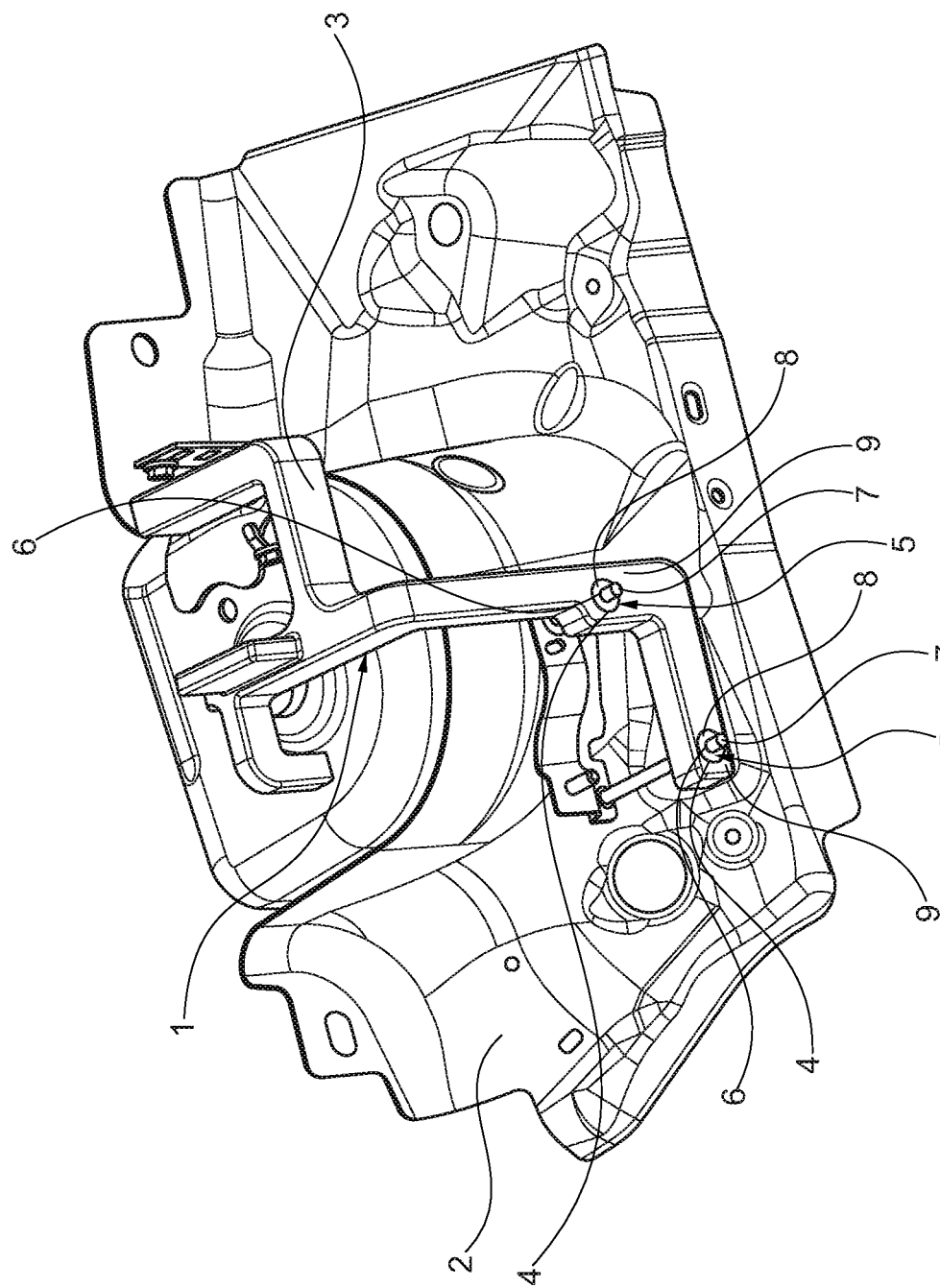
FIG. 1 shows a schematic and perspective representation of one illustrative form of a production aid according to the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

FIG. 1 shows a schematic and perspective representation of one illustrative form of a production aid 1 according to the present disclosure for positioning at least one component (not shown) relative to a further component 2.

The production aid 1 has a monolithic positioning main body 3, which is configured such that, given its prescriptively correct arrangement on the further component 2, it predefines a prescriptively correct positioning of the component relative to the further component 2. The positioning main body 3 is produced additively from a plastic and has a complex geometry.

On the positioning main body 3 are configured two openings 4, into which there is respectively positively fitted a dedicated spacer bushing 5, which has a through hole 6 through which a dedicated positioning member or pin 7 via which the positioning main body 3 makes contact with the further component 2 is guided. A longitudinal center axis (not shown in FIG. 1) of the respective through hole 6 is parallelly offset from a longitudinal center axis (not shown in FIG. 1) of the respective spacer bushing 5. The spacer bushings 5 can be manufactured using an additive production process or an injection molding process.

An outer peripheral surface (not shown in FIG. 1) of the respective spacer bushing 5 and a therewith contacting inner peripheral surface (not shown in FIG. 1) of a section, comprising the respective opening 4, of the positioning main body 3 are respectively configured as a hollow cylinder having a circular base area.

On an axial end face 8 of the respective spacer bushing 5 can be arranged at least one marking (not shown in FIG. 1), which indicates a direction in which the longitudinal center axis of the respective through hole 6 is arranged parallelly offset from the longitudinal center axis of the respective spacer bushing 5. Moreover, on a shown axial end face 9 of that section of the positioning main body 3 which comprises the respective opening 4, at least one marking (not shown in FIG. 1) can be arranged.

The production aid 1 can have at least two differently configured spacer bushings 5, which can selectively be fitted into the respective opening 4 and which differ from one another in terms of the distance of the longitudinal center axis of the respective through hole 6 from the longitudinal center axis of the respective spacer bushing 5, yet have a common external shape.

On the positioning main body 3 can be configured at least two corresponding openings 4, the longitudinal center axes (not shown in FIG. 1) of which are oriented non-parallel to one another and into which there is positively fitted the respectively one dedicated spacer bushing 5, which has a through hole 4 into which is inserted a dedicated positioning pin 7 via which the positioning main body 3 makes contact with the further component 2, wherein a longitudinal center axis (not shown in FIG. 1) of the through hole 4 is arranged parallelly offset from a longitudinal center axis (not shown in FIG. 1) of the spacer bushing 5.

Figure 2:
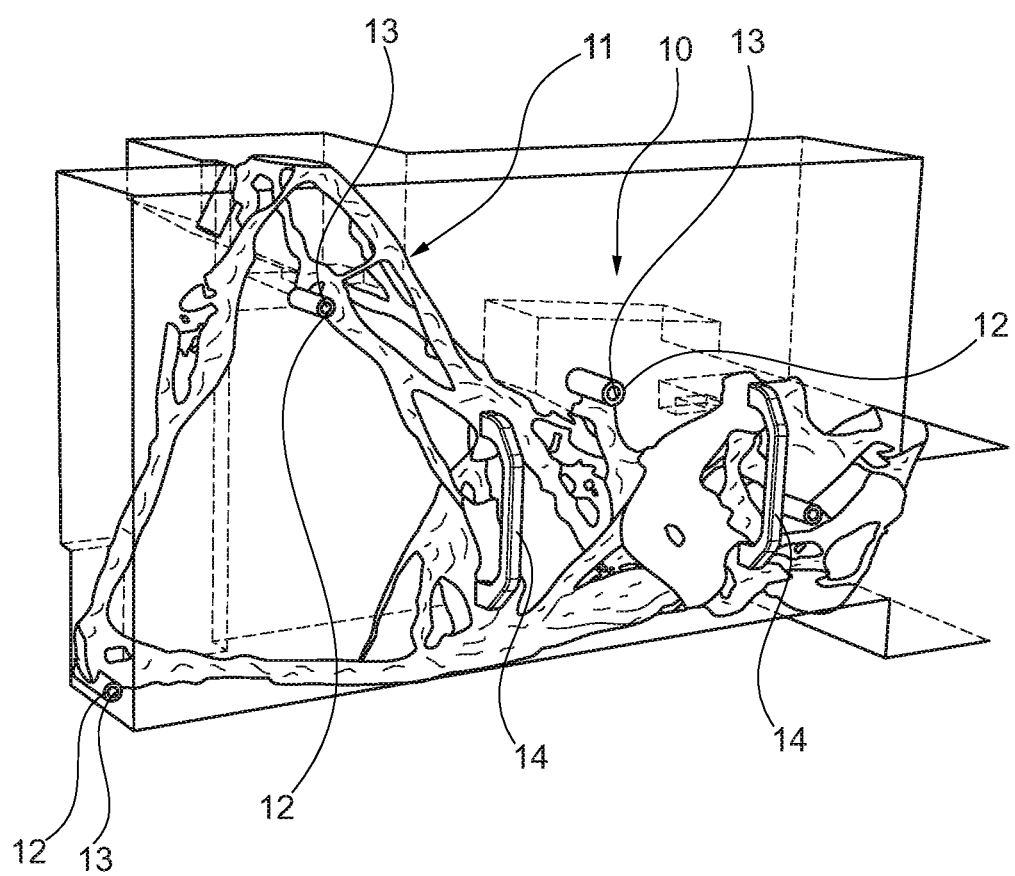
FIG. 2 shows a schematic and perspective representation of a further illustrative form of a production aid according to the present disclosure.

FIG. 2 shows a schematic and perspective representation of a further illustrative form of a production aid 10 according to the present disclosure for positioning at least one component (not shown) relative to a further component (not shown).

The production aid 10 has a monolithic positioning main body 11, which is configured such that, given its prescriptively correct arrangement on the further component, it predefines a prescriptively correct positioning of the component relative to the further component. The positioning main body 11 is produced additively from a plastic and has a complex geometry.

On the positioning main body 11 are configured five openings 12, into which there is respectively positively fitted a dedicated spacer bushing (not shown in FIG. 2), which has a through hole (not shown in FIG. 2) through which a dedicated positioning pin (not shown in FIG. 2) via which the positioning main body 11 makes contact with the further component is guided. A longitudinal center axis (not shown in FIG. 2) of the respective through hole is parallelly offset from a longitudinal center axis (not shown in FIG. 2) of the respective spacer bushing. The spacer bushings and the positioning pins can be configured according to one of the illustrative forms shown in FIGS. 1 and 3 to 6, for which reason, with respect to the spacer bushings and positioning pins, reference is made to the description to FIGS. 1 and 3 to 6. The spacer bushings can be manufactured using an additive production process or an injection molding process.

An outer peripheral surface (not shown in FIG. 2) of the respective spacer bushing and a therewith contacting inner peripheral surface 13 of that section of the positioning main body 11 which comprises the respective opening 12 are respectively configured as a hollow cylinder having a circular base area.

On an axial end face (not shown in FIG. 2) of the respective spacer bushing can be arranged at least one marking (not shown in FIG. 2), which indicates a direction in which the longitudinal center axis (not shown in FIG. 2) of the respective through hole is arranged parallelly offset from the longitudinal center axis (not shown in FIG. 2) of the respective spacer bushing. Moreover, on the positioning main body 11, adjacent to the respective opening 12, at least one marking (not shown in FIG. 2) can be arranged.

The production aid 10 can have at least two differently configured spacer bushings, which are selectively fittable into the respective opening 12 and which differ from one another in terms of the distance of the longitudinal center axis of the respective through hole from the longitudinal center axis of the respective spacer bushing.

As shown in FIG. 2, on the positioning main body 11 are arranged a plurality of openings. In this example, five corresponding openings 12 are illustrated, wherein the longitudinal center axis (not shown in FIG. 2) of at least one opening 12 (shown top left in FIG. 1) is oriented non-parallel or transversely to the parallel longitudinal center axes (not shown in FIG. 2) of the other openings 12.

On the positioning main body 11 are additionally arranged two handles 14, via which a handling of the production aid 10 can be realized.

Figure 3:
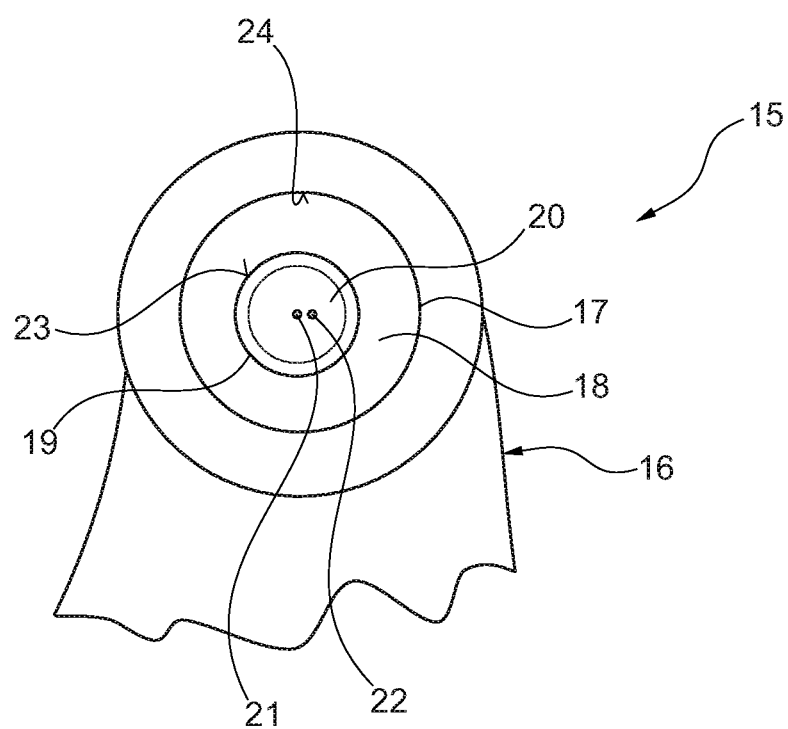
FIG. 3 shows a schematic representation of a detail of a further illustrative form of a production aid according to the present disclosure.

FIG. 3 shows a schematic representation of a detail of a further illustrative form of a production aid 15 according to the present disclosure for positioning at least one component (not shown) relative to a further component (not shown).

The production aid 15 has a monolithic positioning main body 16, of which, in FIG. 3, only a section is shown and which is configured such that, given its prescriptively correct arrangement on the further component, it predefines a prescriptively correct positioning of the component relative to the further component. The positioning main body 16 is produced additively from a plastic and can have complex geometry.

On the positioning main body 16 is configured at least the shown opening 17, into which there is positively fitted a spacer bushing 18, which has a through hole 19 through which a positioning member or pin 20 via which the positioning main body 16 makes contact with the further component is guided. A longitudinal center axis 21 of the through hole 17 is arranged parallelly offset from a longitudinal center axis 22 of the spacer bushing 18. The spacer bushing 18 can be manufactured using an additive production process or an injection molding process. Alternatively, the spacer bushing 18 can have a positioning member or pivot (not specifically shown), which is monolithically connected to the spacer bushing 18 and the longitudinal center axis of which is parallelly offset from the longitudinal center axis 22 of the spacer bushing 18.

An outer peripheral surface 23 of the spacer bushing 18 and a therewith contacting inner peripheral surface 24 of a section, comprising the opening 17, of the positioning main body 16 are respectively configured as a hollow cylinder having a circular base area.

The production aid 15 can have at least two differently configured spacer bushings 18, which can selectively be fitted into the opening 17 and which differ from one another in terms of the distance of the longitudinal center axis 21 of the respective through hole 19 from the longitudinal center axis 22 of the respective spacer bushing 18, and of which, in FIG. 3, only one is shown.

On the positioning main body 16 can be configured at least two corresponding openings 17, of which, in FIG. 3, only one is shown and the longitudinal center axes (not shown) of which are oriented parallel to one another and into which there is respectively positively fitted a dedicated spacer bushing 18, which has a through hole 19 through which a dedicated positioning pin 20 via which the positioning main body 16 makes contact with the further component is guided. A longitudinal center axis 21 of the respective through hole 19 is parallelly offset from the longitudinal center axis 22 of the respective spacer bushing 18.

Figure 4:
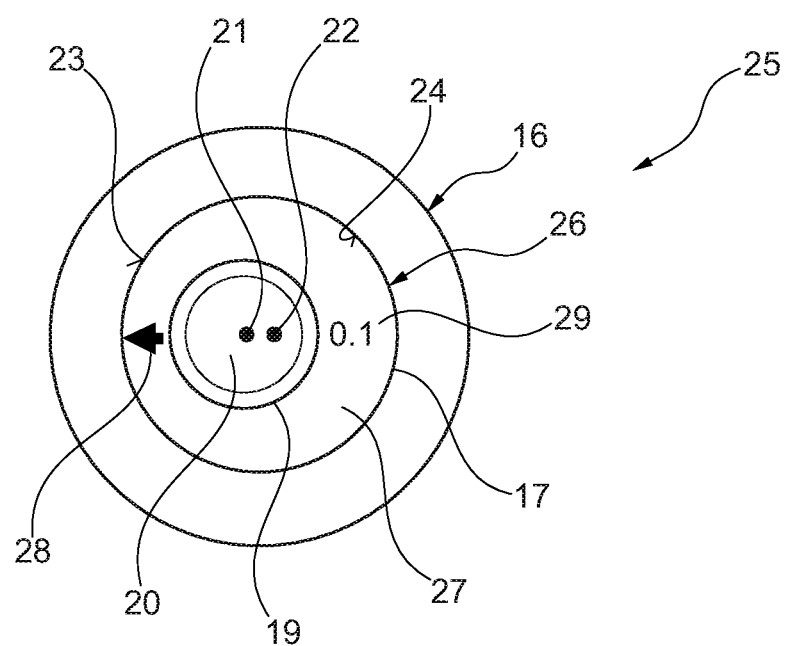
FIG. 4 shows a schematic representation of a detail of a further illustrative form of a production aid according to the present disclosure.

FIG. 4 shows a schematic representation of a detail of a further illustrative form of a production aid 25 according to the present disclosure for positioning at least one component (not shown) relative to a further component (not shown).

The production aid 25 differs from the illustrative form shown in FIG. 3 by virtue of the fact that on the axial end face 27 of the spacer bushing 26 are arranged a marking 28 in the form of an arrow indicating a direction in which the longitudinal center axis 21 of the through hole 19 is arranged parallelly offset from the longitudinal center axis 22 of the spacer bushing 26, and a marking 29 in the form of a numerical value indicating by what extent the longitudinal center axis 21 of the through hole 19 is arranged parallelly offset from the longitudinal center axis 22 of the spacer bushing 26, to be precise on mutually opposite sides of the through hole 19. For the avoidance of repetitions, reference is additionally made to the above description to FIG. 3.

Figure 5:
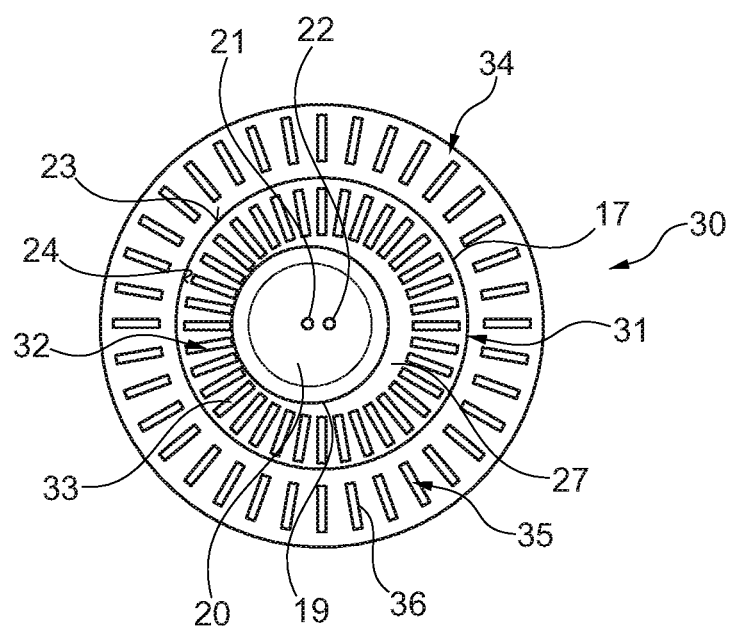
FIG. 5 shows a schematic representation of a detail of a further illustrative form of a production aid according to the present disclosure.

FIG. 5 shows a schematic representation of a detail of a further illustrative form of a production aid 30 according to the present disclosure for positioning at least one component (not shown) relative to a further component (not shown).

The production aid 30 differs from the illustrative form shown in FIG. 3 by virtue of the fact that on the axial end face 27 of the spacer bushing 31 is arranged a marking 32 in the form of a scale having circumferentially evenly spaced bars 33, of which the bar 33 which is shown at the top in FIG. 5 differs visually from the other bars 33. Moreover, on the positioning main body 34, adjacent to the opening 17, is arranged a marking 35 in the form of a scale having circumferentially evenly spaced bars 36, of which the bar 36 which is shown at the top in FIG. 5 differs visually from the other bars 36. For the avoidance of repetitions, reference is additionally made to the above description to FIG. 3.

Figure 6:
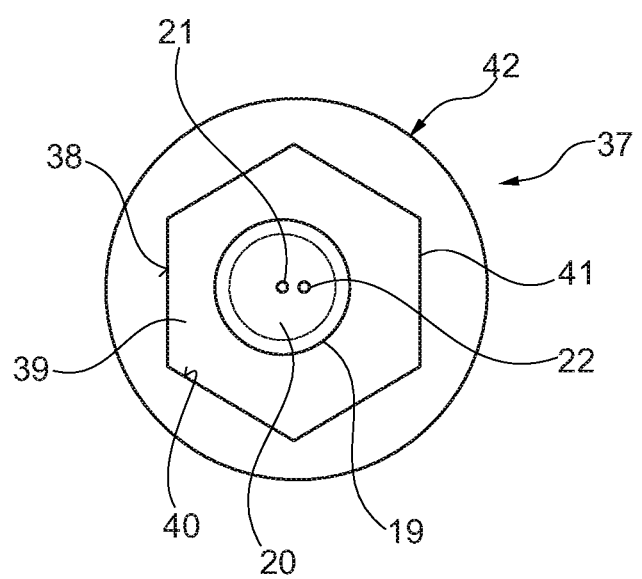
FIG. 6 shows a schematic representation of a details of a further illustrative form of a production aid according to the present disclosure.

FIG. 6 shows a schematic representation of a detail of a further illustrative form of a production aid 37 according to the present disclosure for positioning at least one component (not shown) relative to a further component (not shown).

The production aid 37 differs from the illustrative form shown in FIG. 3 by virtue of the fact that an outer peripheral surface 38 of the spacer bushing 39 and a therewith contacting inner peripheral surface 40 of the opening 41 of the positioning main body 42 are respectively configured as a hollow cylinder having a polygonal, in particular hexagonal, base area. For the avoidance of repetitions, reference is additionally made to the above description to FIG. 3.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, manufacturing technology, and testing capability.

As used herein, the phrase at least one of A, B, and C should be construed to mean a logical (A OR B OR C), using a non-exclusive logical OR, and should not be construed to mean "at least one of A, at least one of B, and at least one of C.

The description of the disclosure is merely exemplary in nature and, thus, variations that do not depart from the substance of the disclosure are intended to be within the scope of the disclosure. Such variations are not to be regarded as a departure from the spirit and scope of the disclosure. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A production aid for positioning at least one component relative to a further component, the production aid comprising:
    a monolithic positioning main body including a U-shaped member, an elongated member extending non-planar to the U-shaped member, and an angular member extending from the elongated member, the monolithic positioning main body being configured such that when arranged in a prescriptively correct arrangement on the further component, the monolithic positioning main body predefines a prescriptively correct position of the at least one component relative to the further component, wherein the monolithic positioning main body includes at least one opening; and
    a spacer bushing positively fitted into the at least one opening, the spacer bushing having a through hole through which a positioning pin is guided nonplanar to the elongated member, or a positioning pivot monolithically configured with the spacer bushing nonplanar to the elongated member,
    wherein the monolithic positioning main body, via the positioning pin or the positioning pivot, makes contact with the further component, wherein a longitudinal center axis of the through hole is arranged parallelly offset from a longitudinal center axis of the spacer bushing.

2. The production aid as claimed in claim 1, wherein the monolithic positioning main body further comprises a hook element being orthogonal to the U-shaped member.

3. The production aid as claimed in claim 1, wherein an outer peripheral surface of the spacer bushing makes contact with a section of an inner peripheral surface of the at least one opening of the monolithic positioning main body, and are configured as a hollow cylinder having a circular or polygonal base area.

4. The production aid as claimed in claim 1, wherein an axial end face of the spacer bushing includes at least one marking which indicates a direction in which the longitudinal center axis of the through hole is arranged parallely offset from the longitudinal center axis of the spacer bushing.

5. The production aid as claimed in claim 4, wherein the positioning main body includes at least one marking adjacent the at least one opening.

6. The production aid as claimed in claim 1, wherein the monolithic positioning main body includes at least two openings and at least two differently configured spacer bushings are selectively fitted into the at least two openings and differ from one another in terms of a distance of the longitudinal center axis of the respective through hole from the longitudinal center axis of the respective spacer bushing.

7. The production aid as claimed in claim 1, wherein the spacer bushing is manufactured using an additive production process or an injection molding process.

8. The production aid as claimed in claim 1, wherein the monolithic positioning main body includes at least two corresponding openings having longitudinal center axes that are oriented non-parallel to one another.

9. A production aid comprising:
    a monolithic positioning main body defining a plurality of openings and including a U-shaped member with a hook element being orthogonal to the U-shaped member, an elongated member extending orthogonal to the U-shaped member and having an angular member extending from and planar to the elongated member;
    a plurality of spacer bushings, each spacer bushing being disposed in a corresponding one of the openings; and
    a plurality of positioning members, each positioning member being coupled to a corresponding one of the spacer bushings, guided nonplanar to the elongated member, and having a central axis that is offset from a central axis of the spacer bushing.

10. The production aid as claimed in claim 9, wherein a distance of the offset of the central axes of the positioning member and the spacer bushing is different between at least two spacer bushings.

11. The production aid as claimed in claim 9, wherein a central axis of at least one opening among the plurality of openings is oriented non-parallel to a central axis of another opening among the plurality of openings.

12. The production aid as claimed in claim 9 further comprising at least one handle disposed on the monolithic positioning main body.

13. The production aid as claimed in claim 9, wherein an axial end face of the spacer bushing includes at least one marking.

14. The production aid as claimed in claim 9, wherein an axial end face of the spacer bushing includes at least one marking and the monolithic positioning main body includes at least one marking adjacent the plurality of openings.

15. The production aid as claimed in claim 9, wherein an outer peripheral surface of the spacer bushing and an inner peripheral surface of corresponding opening among the plurality of openings each define a polygonal shape or circular shape.

16. A production aid comprising:
    a positioning main body defining an opening and including a U-shaped member with a hook element being orthogonal to the U-shaped member, an elongated member extending orthogonal to the U-shaped member and having an angular member extending from the elongated member; and
    a spacer bushing disposed in the opening, the spacer bushing defining an aperture having a central axis that is offset from a central axis of the spacer bushing, the aperture configured to receive a positioning member pin guided nonplanar to the elongated member.

17. The production aid as claimed in claim 16, wherein the positioning main body is monolithically manufactured using an additive manufacturing process.

18. The production aid as claimed in claim 16, wherein an axial end face of the spacer bushing includes at least one marking.

19. The production aid as claimed in claim 16, wherein the positioning main body includes at least one marking adjacent the opening.

20. The production aid as claimed in claim 16, wherein an outer peripheral surface of the spacer bushing and an inner peripheral surface of the opening define a polygonal shape or circular shape.

* * * * *